United States Patent [19]
Godil

[11] Patent Number: 5,414,552
[45] Date of Patent: May 9, 1995

[54] PARTIALLY LOADED MICROWAVE WAVEGUIDE RESONANT STANDING WAVE ELECTRO-OPTIC MODULATOR

[75] Inventor: Asif A. Godil, Palo Alto, Calif.

[73] Assignee: The Board of Trustees of the Leland Stanford, Jr. University, Stanford, Calif.

[21] Appl. No.: 177,631

[22] Filed: Dec. 27, 1993

Related U.S. Application Data

[63] Continuation of Ser. No. 932,880, Aug. 19, 1992, abandoned.

[51] Int. Cl.[6] .................. G02F 1/035; H01S 3/115
[52] U.S. Cl. ........................... 359/247; 359/237; 359/245; 359/279; 372/26; 385/8
[58] Field of Search ............. 359/237, 245, 247, 248, 359/279, 322; 385/2, 3, 8, 122; 372/21, 26

[56] References Cited

U.S. PATENT DOCUMENTS

| | | | |
|---|---|---|---|
| 3,313,938 | 4/1967 | Peters | 359/247 |
| 4,733,397 | 5/1988 | Gallagher et al. | 372/26 |
| 4,965,540 | 10/1990 | Sullivan | 333/227 |

OTHER PUBLICATIONS

Bonek et al., "Proposed $CO_2$-Laser Standing-Wave Intracavity Coupling Modulator for a 53-GHz CW Signal", IEEE J. Quantum Electron., Feb. 1974, pp. 128–129.
Bonek et al., "Propagation Characteristics of Dielectrically Loaded Rectangular Waveguides for Laser Beam Modulators", Arch. Elek. Übertr. vol. 28 No. 12 (1974), pp. 499–506.
Bonek et al., "Coupling and Tuning of Trapped-Mode Microwave Resonators", Arch. Elek. Übertr. vol. 32, No. 5/6 (1978), pp. 209–214.
Tran et al., "High efficiency resonant cavity microwave optical modulator", Applied Optics, vol. 24, No. 24, 15 Dec. 1985, pp. 4282–4284.
Gallagher, et al., "Principles of a resonant cavity optical modulator", Applied Optics, vol. 25, No. 4, 15 Feb. 1986, pp. 510–514.
Magerl et al., "Broadband electronically tunable resonant microwave modulators for $CO_2$ lasers", Appl. Phys. Lett. 34(7), 1 Apr. 1979, pp. 452–454.
Gary M. Carter, "Tunable high-efficiency microwave frequency shifting of infrared lasers", Appl. Phys. Lett. 32(12), 15 Jun. 1978, pp. 810–812.
El-Shandwily et al., "Traveling-Wave Coherent Light-Phase Modulator", IEEE Trans. Microwave Theory Tech., vol. MTT-20, No. 2, Feb. 1972, pp. 132–137.
Brand et al., "External light modulation with low microwave power", Electronics Letters, Aug. 1966, vol. 2, No. 8, p. 317.

Primary Examiner—Ian J. Lobo
Attorney, Agent, or Firm—Flehr, Hohbach, Test, Albritton & Herbert

[57] ABSTRACT

An elegant design for an optical modulator having a high Q is described. The modulator is made up of a straight-forward microwave guide within which a block of a monocrystalline electro-optic material such as lithium niobate is positioned. The modulator is dimensioned to support sequentially standing waves of modulating energy within the desired bandwidth. Optical radiation to be modulated is introduced into the crystal. In one embodiment designed particularly for the 2–15 GHz range, the amount of crystalline material necessary to interact with the incoming radiation is selected to be a minimum, and in another embodiment designed for the 15–75 GHz frequency range, a zig-zag reflection pattern is provided within the crystal.

3 Claims, 3 Drawing Sheets

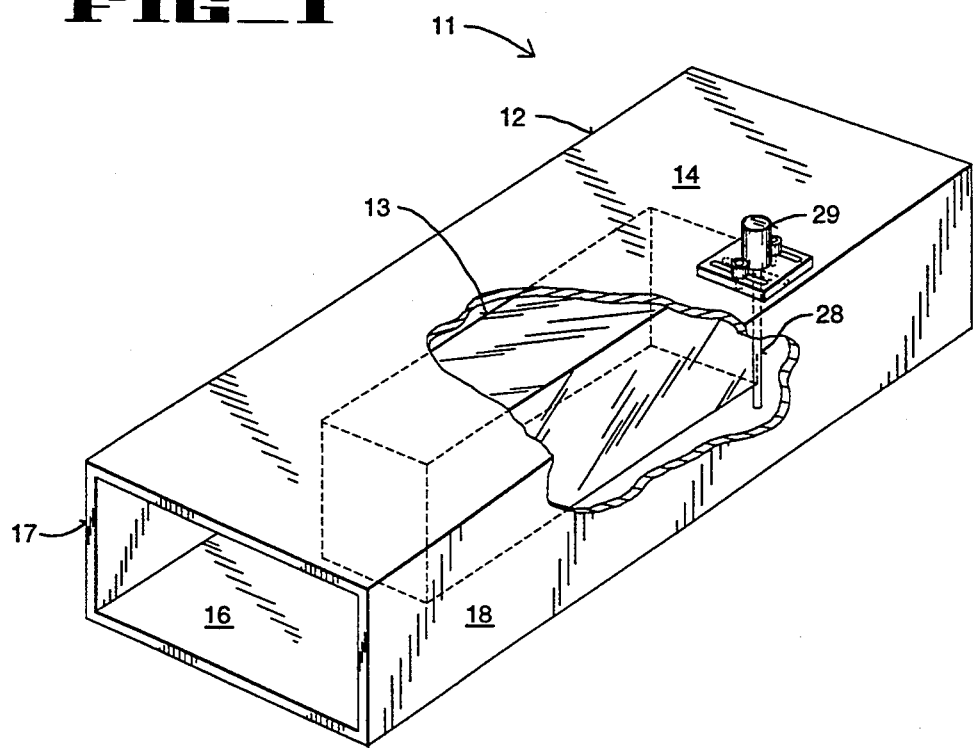
FIG_1
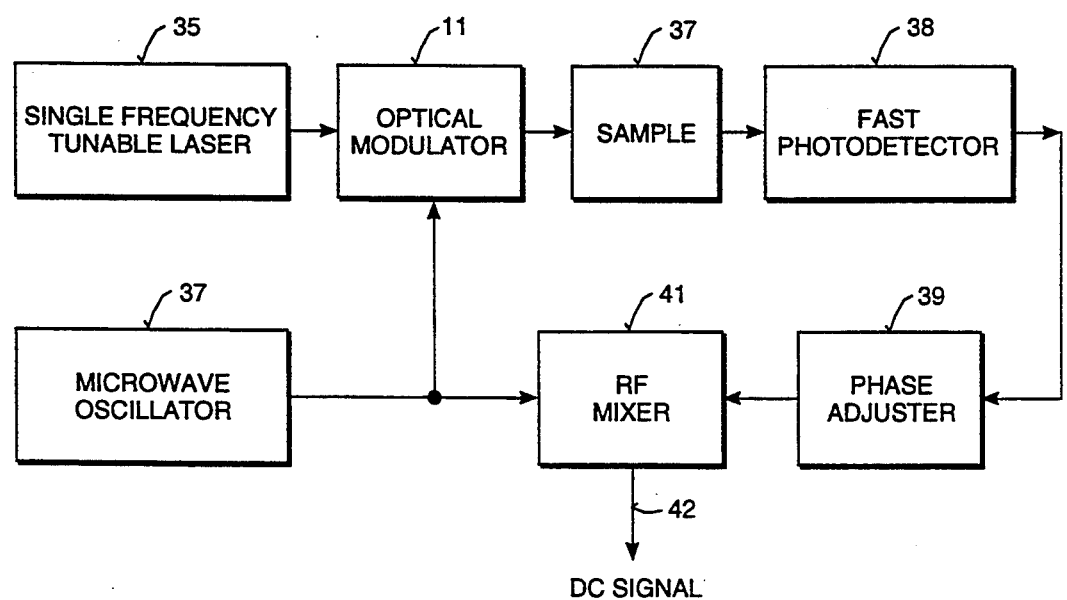
FIG_2

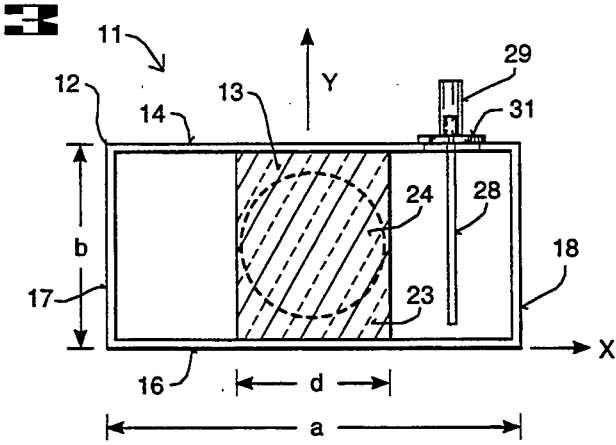
FIG_3
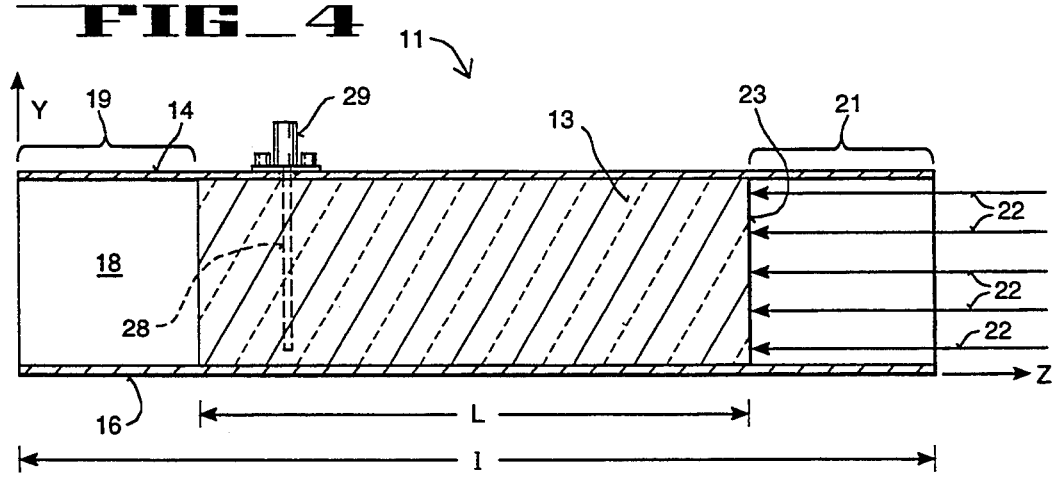
FIG_4
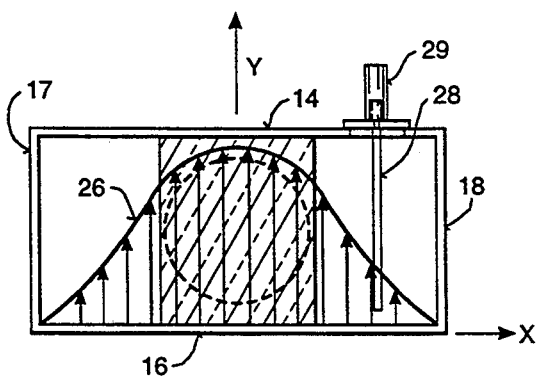
FIG_5
TE$_{10}$
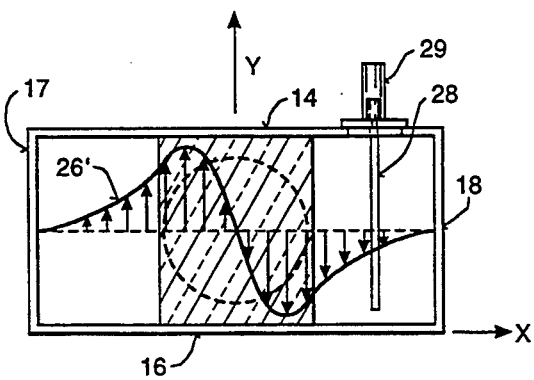
FIG_6
TE$_{20}$

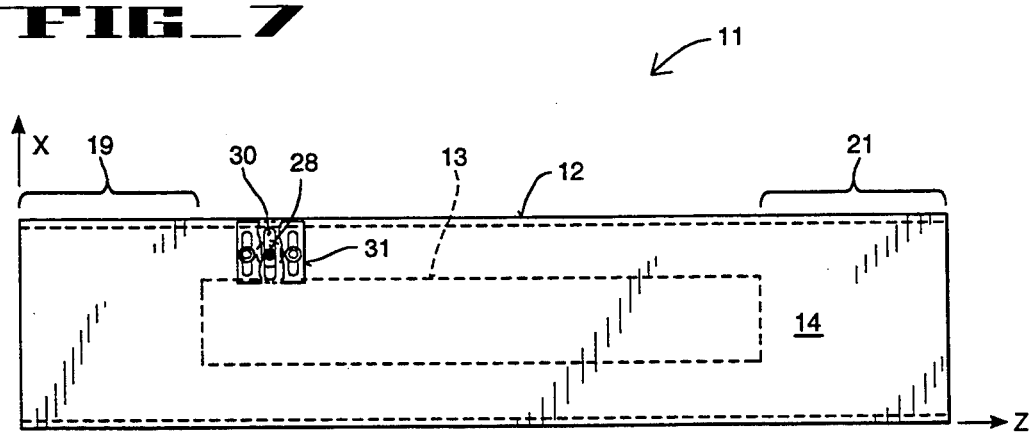
FIG_7
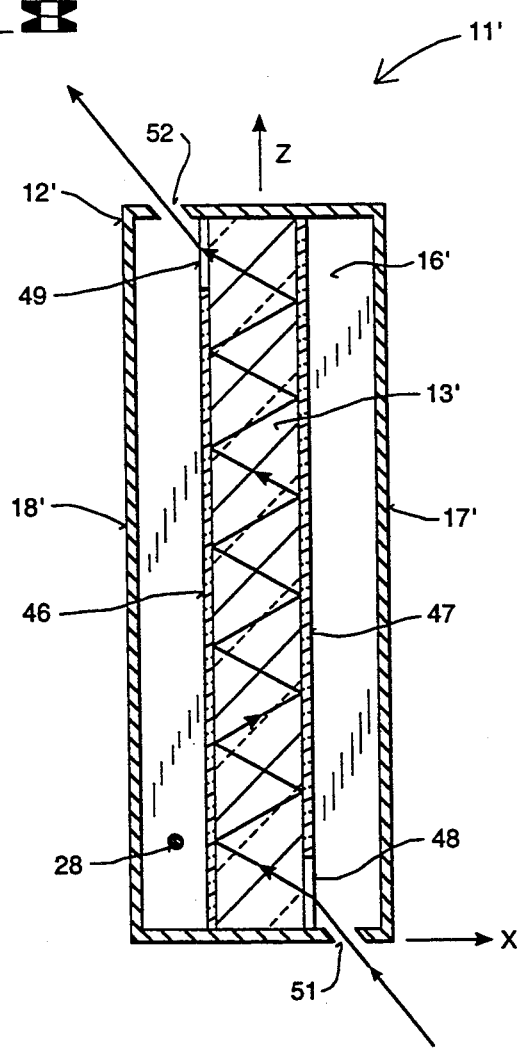
FIG_8

PARTIALLY LOADED MICROWAVE WAVEGUIDE RESONANT STANDING WAVE ELECTRO-OPTIC MODULATOR

The research from which this invention emanated was supported by the United States Government under Air Force contract No. F49620-88-C-0103. The federal government may have rights in and to patents on this invention.

This application is a continuation of application Ser. No. 07/932,880, filed Aug. 19, 1992 now abandoned.

BACKGROUND OF THE INVENTION

The present invention relates to resonant standing wave modulators for optical radiation and, more particularly, to such a modulator which provides coupling of microwave energy to a beam of optical radiation with high efficiency.

Resonant standing wave microwave optical modulators are becoming increasingly important for many different high energy applications. For example, they are finding significant use as part of spectroscopic instruments and for laser mode locking. An optical modulator is a device for either phase or intensity (amplitude) modulating a beam of optical radiation. Most devices of this nature modulate the phase of the optical radiation and some comprise a block of a monocrystalline electro-optic material within a microwave cavity. The microwave cavity supports the modulating energy, and the block of crystalline material applies the same to the optical radiation. In this connection, the microwave energy typically is phase matched or quasi-phase matched, with the optical radiation to be modulated.

In general, modulators of the above type provided in the past have not been very efficient, i.e., power required to achieve a satisfactory degree of modulation of a beam of optical radiation, has been relatively high. These modulators have had a relatively low Q (quality factor). Efficiency is directly related to the Q of a modulator.

SUMMARY OF THE INVENTION

The present invention is a highly efficient yet elegant design for a modulator for a beam of optical radiation. It provides a high Q and consequent high efficiency, while retaining simplicity. In broad terms, it is made up of several parts and relationships, one of which parts is a block of lithium niobate or other electro-optic monocrystalline solid state material transparent to the optical radiation to be modulated. A microwave guide for supporting modulating microwave energy surrounds the block with end sections designed to cooperate with the remainder of the modulator to maintain a resonant standing wave of modulating microwave energy in the guide phase or quasi-phase matched with optical radiation to be modulated. A coupler is also provided as part of the modulator extending into the guide for inputting the modulating microwave energy into the same.

It is important from the simplicity standpoint that the end sections mentioned above which extend longitudinally beyond the block be shaped to support the standing wave. When such end sections are so designed a relatively simple construction for the same is provided and the complications associated with other cut-off type of arrangements are avoided.

In keeping with an aspect of the invention, the crystalline block preferably is shaped to have a minimum of its material extending beyond the transverse sectional area of the beam. In other words, the face of the block which receives the microwave energy is shaped to minimize, to the extent practical, the material of the block which might extend beyond the beam to be modulated. A beam of optical radiation to be modulated typically is disk shaped in transverse section, whereas in the preferred embodiment for simplicity the block is rectangular. Most desirably a dimension of the block in its transverse section area corresponds to the diameter of the beam. It has been found that this type of construction is ideal for building resonant standing wave optical modulators for frequencies in the range of 2–15 GHz.

In keeping with another aspect of the invention, the optical radiation to be modulated is introduced into the block so as to be reflected within the same between side walls in a zig-zag pattern, thereby enhancing its residence time and allowing phase matching beyond 15 GHz. This type of construction is ideal for providing resonant standing wave optical modulation in the frequency range of 15–75 GHz.

It should be noted that as mentioned above it has been proposed in the past that optical modulators include a block of solid state electro-optic material within a resonant microwave cavity. Attention is directed, for example, to the correspondence entitled "Proposed $CO_2$-Laser Standing-Wave Intracavity Coupling Modulator for a 53-GHz CW Signal" by Bonek et al., appearing on page 128 of the IEEE Journal of Quantum Electronics, February, 1974. These arrangements have suffered from one or more deficiencies. In some instances, including that disclosed in the Bonek et al. reference, the crystal fills the effective cavity of the waveguide, thereby requiring a relatively complicated coupling mechanism, such as an orthogonally oriented waveguide section. Moreover, it is not unusual for modulators of this type to include sections at each end as incorporated in that of the Bonek et al. correspondence, having differing width dimensions than those of the effective part of the guide to enable the entry and exit of an optical beam to be modulated without destruction of the resonant character of the waveguide. Most importantly, none of the known prior arrangements have dealt with maintaining simplicity while still providing high (Q).

Other features and advantages of the invention either will become apparent or will be described in connection with the following more detailed description of preferred embodiments of the invention.

BRIEF DESCRIPTION OF THE DRAWING

With reference to the accompanying drawing:

FIG. 1 is an overall isometric view of a preferred embodiment of the invention;

FIG. 2 is a schematic representation of an arrangement for measuring optical absorption and dispersion, which arrangement incorporates the preferred embodiment of the invention of FIG. 1;

FIG. 3 is an end view of the preferred embodiment of FIG. 1, showing its relationship to an entering beam of optical radiation;

FIG. 4 is a side view of the embodiment of FIG. 1;

FIG. 5 is a schematic end view illustrating a representation of an E field of the microwave $TE_{10}$ mode;

FIG. 6 is a schematic end view illustrating a representation of an E field of the microwave $TE_{20}$ mode; and FIG. 7 is a top, slightly broken away view of the preferred embodiment illustrated in FIG. 1; and FIG. 8 is a sectional view of an alternate embodiment of the invention.

DETAILED DESCRIPTION OF THE PREFERRED EMBODIMENT(S)

The following relatively detailed description is provided to satisfy the patent statutes. However, it will be appreciated by those skilled in the art that various changes and modifications can be made without departing from the invention. The following description is exemplary, rather than exhaustive.

A preferred embodiment of the optical modulator of the invention is generally referred to in FIGS. 1 and 3–6 by the reference numeral 11. Such modulator includes, as is illustrated, a microwave guide 12 within which a block 13 of an electro-optic, monocrystalline material which will support the resonant standing wave of microwave energy within the same. Most desirably, such material is lithium niobate (LiNbO$_3$) for a frequency to be supported in the range of between about 2 and 15 GHz.

It is to be noted that the block is so oriented in the guide that the direction of the electrical component of the modulating microwave energy supported by the guide, represented by the y axis in FIG. 3, is generally coincident in direction with the c crystalline axis of the block.

Microwave cavity 12 is generally rectangular and is defined by a pair of relatively broad walls 14 and 16 connecting together at their edges, a pair of relatively narrow side walls 17 and 18. The length (1) of the cavity is selected to support a resonant standing wave of the modulating microwave energy within the same when it includes the block 13 of crystalline material. Such length relative to the length of the crystal if the crystal is lithium niobate is given by the equations given below.

The relationship of the dimension of the guide between its side walls 17 and 18, i.e., its width, to that of the block in the same direction, when properly phase matched, is defined by the equation:

$$K_{x1} \coth K_{x1} (a/2 - d/2) = K_{x2} \tan (K_{x2} d/2)$$

$$K_{x1} = \sqrt{\omega^2 \mu_o \epsilon_o (n_o^2 - 1)}$$

$$K_{x2} = \sqrt{\omega^2 \mu_o \epsilon_o (\epsilon_2 - n_o^2)}$$

where:
d = the dimension of said block between said side walls;
a = the dimension of the waveguide in the xy plane containing the value of d;
$K_{x1}$ = propagation constant in x direction in air;
$K_{x2}$ = propagation constant in x direction in the crystal;
$\epsilon_o$ = permittivity of free space;
$\mu_o$ = permeability of free space;
$n_o$ = refractive index of LiNbO$_3$;
$\epsilon_2$ = dielectric constant of LiNbO$_3$ in the C-axis; and
$\omega$ = angular frequency of the microwave.

The length of the crystalline block is given by:

$$L = \frac{m\pi + 2\phi}{K_z}$$

where:

m = order of resonance (0, 1, 2, 3 . . .) and $$K_z = \sqrt{\omega^2 \mu_o \epsilon_o - K_{x1}^2}$$

where:
$\omega$ = the angular frequency of the microwave;
$\mu_o$ = permeability of free space; and
$\epsilon_o$ = permittivity of free space;
$\phi = \tan^{-1} (Y/K_z)$; and $$\gamma = \frac{\pi}{a} \sqrt{1 - \left(\frac{\omega a}{C_o \pi}\right)^2} ;$$

where:
a = the dimension of the waveguide in the xy plane; and
$\omega$ = the angular frequency of the microwave; and
$C_o$ = speed of light in vacuum.

As mentioned previously, the end sections (referred to by the reference numerals 19 and 21 in FIGS. 4 and 7) are simply provided by extending the broad and relatively narrow side walls of the guide beyond the crystalline block 13. This contributes in a dual fashion to the invention. For one, it results in a relatively simply construction. For another, as also discussed above as one feature of the invention it facilitates providing the modulator with a high Q by acting as a cutoff waveguide (the waveguide is cutoff without the crystal loading. Hence, sections of the unloaded waveguide are used at both ends to effectively confine the microwave to the crystal-loaded region.) In this connection, there is a minimum amount of the crystalline material to provide desired phase modulation of optical radiation. Thus, the guide terminates in end openings which are of the same transverse sectional area as other parts of the waveguide for passage of the optical beam into and out of the block without requiring focusing, thereby increasing the efficiency of the modulation. It further increases the efficiency by allowing one to design the block to minimize the amount of material which is not required to provide the desired modulation. In this connection, as illustrated in FIG. 4 the incoming optical radiation represented by beam lines 22 strike essentially all of the input face 23 of the crystal. Such beam typically will be disk shaped in transverse section as is represented at 24 in FIG. 3 and most desirably the width dimension (d) of the block is selected to be essentially the same as the diameter of the transverse section of such beam. The height (b) of the block 13 is maintained at a minimum to the extent practical and yet provide the dimensions necessary for the guide to support standing waves of high Q—in most instances it will be essentially the same as, or slightly larger than, the diameter of the beam.

FIG. 5 is included to illustrate the effect of the dimensional relationships discussed above for phase modulation. The envelope of energy distribution of the electrical component of the modulated and modulating waves supported in the guide is generally represented at 26. As illustrated, the location of most of this energy at which the modulating and modulated beams react with one another coincides with the location of the crystalline material within the block. FIG. 6 illustrates the effect of the dimensional relationships for intensity modulation.

The envelope of energy distribution is referred to by the reference numeral 26'.

A coupler is provided for inputting the desired modulating microwave energy into the arrangement. Such coupler includes a rod 28 which extends into the cavity adjacent, but spaced from, the crystal 13. It extends almost to the bottom wall 16 of the guide and acts, in essence, with the walls 16 and as a loop coupler. That is, as shown in the drawing, the rod 28 extends into the cavity at a location outside the end sections but spaced from the crystal 13. The coupler further includes a connector 29 for a cable of the like which provides the desired signal. As illustrated best in FIG. 7, the rod 28 extends through a slot 30 in the top wall of the cavity to facilitate adjustment of the distance of the same from the side wall 18 as desired. An interface plate 31 is provided covering the slot and enabling securance of the coupler in a desired adjusted position.

An arrangement is illustrated in FIG. 2 which is significantly enhanced by incorporation of the modulator 11. It is, in block diagram form, a spectroscopic instrument with the modulator 11 accepting optical radiation provided by a tunable, single frequency laser represented at 35. A microwave oscillator 36 forms the desired modulating energy, which energy is coupled into the modulator for interaction with the optical radiation. The modulated radiation is then directed to a sample to be analyzed, represented at 37. A fast photodetector 38 is positioned to detect the resulting photons transmitted through the sample, and the output from the same has its phase adjusted as is indicated by block 39 and then fed to a radio frequency mixer 41. Mixer 41 provides a comparison with the modulating energy and the output represented by line 42 is a DC signal whose power (or current) level is representative of the reaction of the sample to the modulated optical radiation.

As mentioned above, the modulator of the invention provides a quite high Q (quality factor). Although the particular Q achievable in any instance will depend, of course, on the design criteria which is also controlled, in part, by the desired bandwidth to be covered, the Q is related to the phase modulation and the dimensions by the following equation:

$$A = \frac{\pi n_o^3 r_{33}}{\lambda_o} \sqrt{\frac{\alpha P Q_o}{\omega \epsilon_2 \epsilon_o bd[L + \sin(2\phi)/K_z]}} L \frac{\sin u-}{u-}$$

where:

$n_o$ = index of refraction of the crystal;
$r_{33}$ = electro-optic coefficient of the crystal;
$\lambda_o$ = wavelength of light in free space;
$\alpha$ = fraction of electrical energy in crystal $\approx 0.97$;
P = input microwave power;
L = length of crystalline block;
d = width of crystalline block;
b = height of crystalline block;
$\omega$ = frequency of modulation;
$K_z$ = propagation constant of the waveguide = $\sqrt{\omega^2 \mu_o \epsilon_o - K_x^2}1$
$C_o$ = speed of light in vacuum;

$$u- = \frac{\omega L n_o}{2C_o} - \frac{k_z L}{2};$$

$u-$ = o (if perfect phase matching is achieved);
$\epsilon_o$ = permittivity of free space;
$\epsilon_2$ = dielectric constant of electro-optic crystal;
$Q_o$ = quality factor (unloaded);
$\phi = \tan^{-1}(Y/K_z)$;

$$\gamma = \frac{\pi}{a}\sqrt{1 - \frac{\omega a}{C_o \pi}} \; ; \text{ and}$$

A = phase modulation in radians.

FIG. 8 illustrates an arrangement of the invention particularly designed to achieve modulation in the 15–75 GHz range. The side surfaces 46 and 47 of the crystal 13' are coated with a high reflection coating of the type commonly available in the art to reflect optical radiation impinging upon the same, although on opposite sides and at opposite ends there are small input and output radiation areas represented at 48 and 49, respectively, have an antireflection coating in order to permit ingress and egress of optical radiation to be modulated. (The width of the coatings are exaggerated in FIG. 8 for emphasis.) End walls for the guide are provided, which end walls have slots 51 and 52 or other openings to accommodate the beam of optical radiation and direct the same relative to the block.

As mentioned at the beginning of the detailed description, applicant is not limited to the specific embodiment described above. Various changes and modifications can be made. For example, electro-optic monocrystalline materials other than lithium niobate, such as $LiTaO_3$; KTP; and KDP are suitable for use with the invention. The claims, their equivalents and their equivalent language define the scope of protection.

What is claimed is:

1. A resonant standing wave electro-optic modulator for a beam of optical radiation, comprising:
    a) a block of a monocrystalline electro-optic solid state material which is transparent to said optical radiation and positioned to receive said beam therewithin, which block is shaped to have a minimum of said material beyond a transverse sectional area of said beam;
    b) a guide for modulating microwave energy surrounding said block with the direction along which the electrical component of modulating microwave energy ie supported generally coincident with the direction of the major crystalline axis of said block, which guide includes both side walls spaced from said block and microwave cutoff end sections which extend longitudinally beyond said block a distance selected to support with the remainder of said guide, a resonant standing wave of a predetermined microwave frequency having a phase velocity within said block which generally is matched with the phase velocity of said beam of optical radiation when said radiation also is within said block; and
    c) a microwave input coupler extending into said guide for inputting modulating microwave energy thereinto, said coupler comprising a rod which extends into said cavity at a location outside said end sections but spaced from said crystal and selected for said rod to act with the guide structure including one of said side walls as a loop coupler; and
    d) a quality factor, Q, being defined in terms of phase modulation and the dimensions of the electro-optic crystal by the equation:

$$A = \frac{\pi n_o^3 \, r_{33}}{\lambda_o} \sqrt{\frac{a \, P \, Q_o}{\omega \epsilon_2 \epsilon_o b d [L + \sin(2\phi)/K_z]}} \, L \, \frac{\sin u_-}{u_-}$$

where:
- $n_o$ = index of refraction of the crystal;
- $r_{33}$ = electro-optic coefficient of the crystal;
- $\lambda_o$ = wavelength of light in free space;
- $a$ = fraction of electrical energy in crystal $\approx 0.97$;
- $P$ = input microwave power;
- $L$ = length of crystalline block;
- $d$ = width of crystalline block;
- $b$ = height of crystalline block;
- $\omega$ = frequency of modulation;
- $K_z$ = propagation constant of the waveguide = $\sqrt{\omega^2 \mu_o \epsilon_o - K_{x1}^2}$
- $C_o$ = speed of light in vacuum;

$$u_- = \frac{\omega L n_o}{2 C_o} - \frac{k_z L}{2};$$

- $u_- = 0$ (if perfect phase matching is achieved);
- $\epsilon_o$ = permittivity of free space;
- $\epsilon_2$ = dielectric constant of electro-optic crystal;
- $Q_o$ = quality factor (unloaded);
- $\phi = \tan^{-1}(Y/K_z)$;

$$\gamma = \frac{\pi}{a} \sqrt{1 - \frac{\omega a}{C_o \pi}}; \text{ and}$$

- $A$ = phase modulation in radians.

2. A resonant standing wave electro-optic modulator for a beam of optical radiation, comprising:
   a) a block of a monacrystalline electro-optic solid state material which is transparent to said optical radiation and positioned to receive said beam therewithin, which block is shaped to have a minimum of said material beyond a transverse sectional area of said beam;
   b) a guide for modulating microwave energy surrounding said block with the direction along which the electrical component of modulating microwave energy is supported generally coincident with the direction of the major crystalline axis of said block, which guide includes both side walls spaced from said block and microwave cutoff end sections which extend longitudinally beyond said block a distance selected to support with the remainder of said guide, a resonant standing wave of a predetermined microwave frequency having a phase velocity within said black which generally is matched with the phase velocity of said beam of optical radiation when said radiation also is within said block; and
   c) a microwave input coupler extending into said guide for inputting modulating microwave energy thereinto, said coupler comprising a rod which extends into said cavity at a location outside said end sections but spaced from said crystal and selected for said rod to act with the guide structure including one of said side walls as a loop coupler; and
   d) the relationship of the dimension of said guide between said side walls and that of said block in the same direction, when properly phase matched, being defined by the equation:

$$K_{x1} \coth K_{x1} (a/2 - d/2) = K_{x2} \tan (K_{x2} \, d/2)$$

$$K_{x1} = \sqrt{\omega^2 \mu_o \epsilon_o (n_o^2 - 1)}$$

$$K_{x2} = \sqrt{\omega^2 \mu_o \epsilon_o (\epsilon_2 - n_o^2)}$$

where:
- $d$ = the dimension of said block between said side walls;
- $a$ = the dimension of the waveguide in the xy plane containing the value of d;
- $K_{x1}$ = propagation constant in x direction in air;
- $K_{x2}$ = propagation constant in x direction in the crystal;
- $\epsilon_o$ = permittivity of free space;
- $\mu_o$ = permeability of free space;
- $n_o$ = refractive index of LiNbO$_3$;
- $\epsilon_2$ = dielectric constant of LiNbO$_3$ in the C-axis; and
- $\omega$ = angular frequency of the microwave.

3. A resonant standing wave electro-optic modulator for a beam of optical radiation, comprising:
   a) a block of a monocrystalline electro-optic solid state material which is transparent to said optical radiation and positioned to receive said beam therewithin, which block is shaped to have a minimum of said material beyond a transverse sectional area of said beam;
   b) a guide for modulating microwave energy surrounding said block with the direction along which the electrical component of modulating microwave energy is supported generally coincident with the direction of the major crystalline axis of said block, which guide includes both side walls spaced from said block and microwave cutoff end sections which extend longitudinally beyond said block a distance selected to support with the remainder of said guide, a resonant standing wave of a predetermined microwave frequency having a phase velocity within said block which generally is matched with the phase velocity of said beam of optical radiation when said radiation also is within said block; and
   c) a microwave input coupler extending into said guide for inputting modulating microwave energy thereinto, said coupler comprising a rod which extends into said cavity at a location outside said end sections but spaced from said crystal and selected for said rod to act with the guide structure including one of said side walls as a loop coupler; and
   d) the length of said block being given by:

$$L = \frac{m\pi + 2\phi}{K_z}$$

where:
- $m$ = order of resonance (0, 1, 2, 3 . . .) and $$K_z = \sqrt{\omega^2 \mu_o \epsilon_o - K_{x1}^2}$$

where:

$\omega$ = the angular frequency of the microwave;

$\mu_o$ = permeability of free space; and $\epsilon_o$ = permittivity of free space;

$\phi = \tan^{-1}(Y/K_z)$; and $$\gamma = \frac{\pi}{a} \sqrt{1 - \left(\frac{\omega a}{C_o \pi}\right)^2} \; ;$$

where:
  a = the dimension of the waveguide in the xy plane; and
  $\omega$ = the angular frequency of the microwave; and
  $C_o$ = speed of light in vacuum.

* * * * *